United States Patent [19]

Wengrovius et al.

[11] Patent Number: 5,166,296

[45] Date of Patent: Nov. 24, 1992

US005166296A

[54] SHELF-STABLE RTV SILICONE COMPOSITIONS

[75] Inventors: Jeffrey H. Wengrovius; Gary M. Lucas, both of Scotia, N.Y.

[73] Assignee: General Electric Company, Waterford, N.Y.

[21] Appl. No.: 720,344

[22] Filed: Jun. 25, 1991

[51] Int. Cl.$^5$ ............................................. C08G 77/06
[52] U.S. Cl. ...................................... 528/18; 528/21; 528/34; 428/447; 524/268; 524/731
[58] Field of Search .............................. 528/21, 18, 34; 428/447; 524/731, 268

[56] References Cited

U.S. PATENT DOCUMENTS

| | | | |
|---|---|---|---|
| 4,705,826 | 11/1987 | Weber et al. | 524/860 |
| 4,781,973 | 11/1988 | Zotto | 528/21 |
| 4,826,915 | 5/1989 | Stein et al. | 524/731 |
| 4,863,992 | 9/1989 | Wengrovius et al. | 524/731 |

*Primary Examiner*—Melvyn I. Marquis
*Assistant Examiner*—Margaret W. Glass

[57] ABSTRACT

A method is provided for preparing a polyalkoxysilyl-terminated polydiorganosiloxane having higher viscosity and improved stability in viscosity over long storage periods, comprising reating (A) at least one silanol-terminated polydiorganosiloxane; and (B) at least one polyalkoxysilane; the reaction being conducted in the presence of (C) a catalytic amount of an acidic amine salt; and (D) an effective amount of an organic formate. In addition, the present invention provides a method for making such polyalkoxysilyl-terminated silicone compositions, as well as shelf-stable, one component RTV's containing these compositions.

17 Claims, No Drawings

SHELF-STABLE RTV SILICONE COMPOSITIONS

BACKGROUND OF THE INVENTION

The present invention is related to alkoxy-functional room temperature vulcanizable silicone compositions. More particularly, the present invention is related to scavenger-free, alkoxy-functional room temperature vulcanizable silicone compositions having improved shelf-stability.

Polyalkoxysilyl-terminated polydiorganosiloxanes are the primary constituent in alkoxy-functional room temperature vulcanizable (RTV) silicone compositions. The polyalkoxysilyl-terminated polydiorganosiloxanes are typically prepared by an end-capping reaction between a silanol-terminated silicone polymer with an alkoxysilane. A byproduct of this endcapping reaction is an organic alcohol, such as methanol. Fast endcapping of the silanol-terminated silicone polymer with the alkoxysilane usually requires a catalyst, several of which are known in the art. Unfortunately, such endcapping catalysts, as well as the alcohol by-product of the endcapping reaction, can promote silicone redistribution reactions, wherein new and different silicone polymers, e.g., monoalkoxy-terminated silicones, are formed which do not cure upon exposure to moisture and a cure catalyst. The ultimate result is an RTV composition which is not shelf-stable. In addition, the presence of the endcapping catalyst and the alcohol by-product can cause the polyalkoxysilyl-terminated silicone polymer to substantially decrease in viscosity upon storage. Such viscosity loss over time may render an RTV composition difficult or impossible to use. Thus, the endcapping catalyst and the alcohol by-product must be removed from the endcapped silicone polymer in order to prevent the silicone redistribution reactions and the viscosity loss which adversely affect the shelf stability and usefulness of the final RTV silicone composition.

U.S. Pat. No. 4,863,992 to Wengrovius et al. (Wengrovius) is directed to an improved endcapping catalyst for use in making the polyalkoxysilyl-terminated polydiorganosiloxane. The catalyst disclosed in the Wengrovius patent is an acidic amine salt which promotes fast endcapping but subsequently decomposes to form inert products, such as carboxylic acid amides and/or esters, which are ineffective to decrease the viscosity of the polyalkoxysilyl-terminated silicone.

It is desirable to improve the Wengrovius RTV system by increasing the decomposition rate of the endcapping catalyst used therein, thereby resulting in a polyalkoxysilyl-terminated silicone polymer having higher viscosity and greater stability in viscosity over prolonged storage periods and an RTV composition having greater shelf stability.

The present invention is based on the discovery that an organic formate, preferably an alkyl formate, will accelerate the decomposition of the ammonium formate endcapping catalyst.

SUMMARY OF THE INVENTION

The present invention provides a novel class of polyalkoxysilyl-terminated silicone compositions which have higher viscosity and improved stability in viscosity over long storage periods. In addition, the present invention provides a method for making such polyalkoxysilyl-terminated silicone compositions, as well as shelf-stable, one component RTV compositions containing these compositions.

DETAILED DESCRIPTION OF THE INVENTION

In one of its aspect, the present invention provides a method for preparing a polyalkoxysilyl-terminated polydiorganosiloxane, comprising the step of reacting at a temperature in the range of from about 10° to about 150° C.:

(A) 100 parts of at least one silanol-terminated polydiorganosiloxane; and (B) at least one polyalkoxysilane in an amount effective for endcapping (A) of, the polyalkoxysilane having the formula $$(R^2)_a Si(OR^3)_{4-a}$$

wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1; the reaction between (A) and (B) being conducted in the presence of:

(C) a catalytic amount of an acidic amine salt; and (D) an effective amount of an organic formate having the formula $$H-\overset{\overset{O}{\|}}{C}-O-R$$

wherein R is a monovalent organic radical having from 1 to about 20 carbon atoms.

Silanol-terminated polydiorganosiloxanes, polyalkoxysilanes, and acidic amine salts useful in the practice of this invention and a method for reacting them to form polyalkoxysilyl-terminated polydiorganosiloxane are disclosed in U.S. Pat. No. 4,863,992 to Wengrovius et al., which is hereby incorporated by reference herein.

Silanol-terminated polydiorganosiloxanes useful as (A) in this invention typically have the general formula:

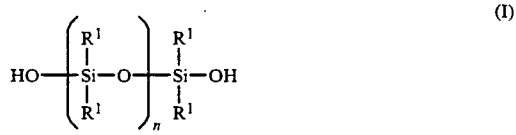

wherein each $R^1$ is independently an unsubstituted or substituted hydrocarbon radical containing from about 1 to about 15 carbon atoms and "n" is a number in the range of from about 5 to about 5000. Examples of $R^1$ radicals include methyl, ethyl, phenyl, trifluoropropyl and vinyl. Preferably, each $R^1$ is an alkyl radical having from 1 to about 4 carbon atoms and most preferably methyl.

The silanol-terminated silicone of formula (I) can be prepared by various methods known in the art, for example, those methods taught in Lampe, U.S. Pat. No. 3,888,815 and Peterson, U.S. Pat. No. 4,250,290, which are both incorporated by reference herein.

The polyalkoxysilane (B) used as an endcapping reagent in the method of this invention has the general formula:

$$(R^2)_a Si(OR^3)_{4-a} \quad (II)$$

wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1.

In formula (II), "a" is preferably 1, $R^2$ is preferably an alkyl radical having from 1 to about 4 carbon atoms and most preferably methyl, and $R^3$ is also preferably an alkyl radical having from 1 to about 4 carbon atoms and most preferably methyl.

Examples of compounds suitable as the polyalkoxysilane endcapping reagent (B) herein include methyltrimethoxysilane (which is usually preferred), methyltriethoxysilane, ethyltrimethoxysilane, tetraethoxysilane, and vinyltrimethoxysilane.

The endcapping catalyst (C) for the reaction between the silanol-terminated silicone (A) and the polyalkoxysilane endcapping reagent (B) is an acidic amine salt which subsequently decomposes to products which are substantially inert when contacted with polyalkoxysilyl-terminated silicones. By "acidic amine salt" is meant one which, when dissolved in water in substantially pure form, yields a solution with a pH of about 7. The decomposition products are not themselves substantially acidic, since it has been found that acidic materials cause material viscosity increase in such silicones when they remain in contact therewith. The products may, however, be functional derivatives of acids.

A preferred class of acidic salts is the amine salts of formic acid. The identity of the amine is not critical but mono-, di, and trialkylamines are preferred, especially those in which the alkyl groups contain about 3 to about 8 carbon atoms and most especially dialkylamines. The most preferred amines are di-n-butylamine and diisobutylamine. For the most part, di-(sec-alkyl)amines such as diisobutylamine have less tendency than di-(n-alkyl)amines to cause yellowing of RTVs cured with tin complexes such as dibutyltin bis(acetylacetonate).

The amine salt of formic acid may be previously prepared and incorporated in the reaction mixture, or it may be prepared in situ in the mixture by the addition of formic acid and a suitable amine. An excess of either reagent may be used, most often up to a molar ratio of about 15:1.

The organic formate (D) has the formula $$\underset{H-C-O-R}{\overset{O}{\|}} \quad (III)$$

wherein R is a monovalent organic radical having from 1 to about 20 carbon atoms. R is preferably an alkyl radical having from 1 to about 20, preferably from about 1 to about 10, and most preferably from about 1 to about 4, carbon atoms.

The organic formate can be prepared by means of an esterification reaction between an organic alcohol and formic acid to form an ester and water as a by-product. For example, ethylformate can be prepared by reacting formic acid and ethanol.

It is to be understood that only the esters of formic acid can be used in this invention. The esters of other organic acids are not suitable for use herein. As is known in the art, esters of formic acid react rapidly with amines. In the present invention, the ester of formic acid reacts rapidly with the amino portion of the amine acidic catalyst and thereby decomposes the catalyst relatively quickly. The high rate of that reaction and consequently the high rate of catalyst decomposition effected by that reaction contributes substantially to the increased shelf stability of the RTV composition of this invention. On the other hand, the esters of other organic acids react very little and or not at all with amines and hence would not contribute to the decomposition of the acid amine catalyst and the shelf stability of the RTV composition.

In the present invention, the organic formate may be added to the reaction mixture containing (A), (B), and (C) before the endcapping reaction or it may be added after the endcapping reaction to the resulting mixture containing the polyalkoxysilyl-terminated polydiorganosiloxane. Alternatively, the organic formate may be added to the uncured RTV silicone composition containing a polyalkoxysilyl-terminated polydiorganosiloxane and the tin condensation curing catalyst used herein. The order of addition of the organic formate is not critical to the present invention.

The endcapping reaction may be conducted by merely heating the above-described reaction mixture to a temperature within the range of about 10° to about 150° C., preferably from about 75 to about 125, and most preferably from about 90° to about 110° C. for a suitable period of time, typically about 0.5 to about 2 hours, preferably with agitation. Diluents can be used but are seldom necessary or desired.

Except for the organic formate, the proportions of reagents used in the preparation of the polyalkoxysilyl-terminated polydiorganosiloxane of the present invention are not critical.

If it is added to the endcapping reaction mixture containing (A), (B) and (C) before the endcapping reaction has taken place, the organic formate is used in an amount within the range of from about 0.01 to about 10, preferably from about 0.05 to about 5, and most preferably from about 0.10 to about 1, parts by weight per 100 parts of the silanol-terminated silicone polymer (A). If it is added to the reacted mixture containing the polyalkoxysilyl-terminated polydiorganosiloxane product or to the uncured RTV composition, the organic formate is used in an amount within the range of from about 0.01 to about 10, preferably from about 0.05 to about 5, and most preferably from about 0.10 to about 1, parts by weight per 100 parts of the polyalkoxysilyl-terminated polydiorganosiloxane.

The amount of organic formate is critical because a too low amount will be ineffective while a too high amount will lower the viscosity and increase the volatile content of the final polymer product.

Most often, the polyalkoxysilane (B) is used in an amount ranging from about 0.5 to about 10.0, preferably from about 1 to about 5, and most preferably from about 1.5 to about 3, parts by weight per 100 parts of the silanol-terminated silicone (A).

The acidic amine salt (C) is typically used in an amount ranging from about 0.005 to about 3.0, preferably from about 0.05 to about 1.0, and most preferably from about 0.1 to about 0.5, parts by weight per 100 parts of the silanol-terminated silicone (A). When the catalyst is an amine salt of formic acid prepared in situ, the proportions of amine and formic acid per 100 parts of silicone are most often about 0.001 to about 1.0 part of silicone and about 0.001 to about 0.5 part by weight, respectively. The formic acid may be used in the form of a commercially available aqueous solution.

In general, stabilized product viscosities vary directly with reaction temperature and inversely with a proportion of catalyst and endcapping reagent. For a high viscosity product, it is frequently preferred to use temperatures in the range of about 90° to about 110° C. and catalyst and polyalkoxysilane levels in the range of about 0.05 to about 0.30 and about 0.5 to about 3.0 parts by weight, respectively, per 100 parts of silanol-terminated silicone.

The degree of completion of the endcapping reaction can be determined by silicon-29 nuclear magnetic resonance spectroscopy. It can also be determined qualitatively by the "titanium coupling test", performed by adding a tetraalkyl titanate or zirconate. If a substantial proportion (i.e., greater than 5%) of silanol-terminated silicone remains in the mixture, it reacts therewith to form a gel. Absence of gel formation indicates essentially complete reaction.

The polyalkoxysilyl-terminated silicones prepared by the method of this invention can typically be represented by the formula

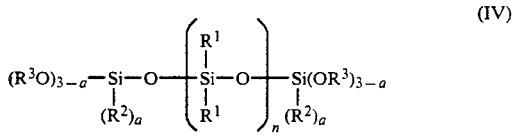

(IV)

wherein $R^1$, $R^2$, and $R^3$, "a" and "n" are as previously defined.

As discussed previously herein, the organic formate may be added to the endcapping reaction mixture before or after the completion of the endcapping reaction, or it may be added to the uncured RTV silicone composition described hereinafter.

Therefore, another aspect of the present invention is an alkoxy-functional RTV polydiorganosiloxane composition comprising by weight:

(1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polyalkoxy-terminated polydiorganosiloxane being the product prepared by reacting (A) and (B) in the presence of (C) and (D) as described hereinabove; and (2) an effective amount of a diorganotin bis beta-diketonate condensation catalyst of the general formula:

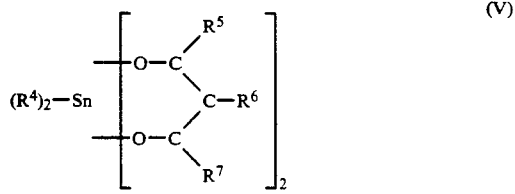

(V)

wherein $R^4$ is selected from $C_{(1-18)}$ monovalent hydrocarbon radicals and substituted monovalent hydrocarbon radicals, and $R^5$, $R^6$, and $R^7$ are the same or different monovalent radicals selected from the class consisting of hydrogen, $R^4$, $OR^4$, $-Si(R^4)_3$, $-OSi(R^4)_3$, aryl, acyl, and nitrile.

Another aspect of this invention provides an alkoxy-functional RTV polydiorganosiloxane composition comprising by weight:

(1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polyalkoxy-terminated polydiorganosiloxane being prepared by reacting (A) and (B) in the presence of (C) as described hereinabove;

(2) an effective amount of a diorganotin bis beta-diketonate condensation catalyst of the general formula (V) set forth above; and (3) an effective amount of an organic formate of formula (III).

Component (1) of the RTV compositions of the present invention is a diorganopolysiloxane polymer terminated at each end of the polymer chain by at least two alkoxy radicals and having a viscosity varying from about 100 to about 1,000,000 centipoise at 25° C. and preferably from about 5000 to about 200,000 centipoise at 25° C. The organic group of the polymer is a $C_{1-15}$ monovalent hydrocarbon radical. Preferably, the polymer constituting component (1) has the general formula (IV) set forth previously herein. The terminal silicon atom in the polymer of component (1) must have at least two alkoxy groups and can have as many as three alkoxy groups in accordance with the above description.

Component (2) of the RTV compositions of this invention is a diorganotinbis-diketonate condensation catalyst of the general formula (V) set forth hereinbefore. Radicals included within $R^4$ of formula (V) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl.

Some of the tin condensation catalysts included within formula (V) are, for example, di(n-butyl)tinbis(acetylacetonate); di(n-butyl)tinbis(benzoylacetonate): di(ethyl)tinbis(lauroylacetonate); di(methyl)tinbis(pivaloylacetonate); di(n-octyl)tinbis(acetylacetonate); di(n-propyl)tinbis(1,1,1-trifluoroacetylacetonate); di(n-butyl)tinbis(ethylacetoacetate); and di(n-butyl)tin(acetylacetonate)(ethylacetoacetate). The preferred tin catalyst for use in the present invention is di(n-butyl)tinbis(acetylacetonate).

Effective amounts of the condesation catalyst to facilitate the cure of the RTV compositions are, for example, from about 0.01 to about 2.0, preferably from about 0.1 to about 1.0, and most preferably from about 0.2 to about 0.4, parts by weight per 100 parts of the alkoxy-functional polydiorganosiloxane (1).

In a preferred embodiment, the RTV silicone compositions of this invention also contain an effective amount of at least one adhesion promoter (4). Suitable adhesion promoters for use in this invention include those disclosed in U.S. Pat. Nos. 3,888,815; 4,472,590; 4,483,973; and 4,826,915; the disclosures of all of which are incorporated by reference herein, which disclose adhesion promoters which are organo-functional polyalkoxysilanes comprising diavlent saturated, unsaturated, or aromatic hydrocarbon radicals functionalized with polar organic radicals selected from amido, formamido, imidato, urea, isocyanato, cyano, acryloxy, acyloxy, ether, and epoxy.

However, a limited selection of such compounds is particularly preferred by reason of providing improved adhesion to unprimed aluminum surfaces and to steel surfaces. Therefore, the preferred adhesion promoter for use in this invention is a compound selected from the group consisting of N-trialkoxysilylalkyl-substituted amides and imides; N-mono(trialkoxysilylalkyl)-substituted ureas; N,N'-bis(trialkoxysilylalkyl)-substituted ureas; and trialkoxysilylalkyl isocyanurates.

Other preferred adhesion promoters for use herein include, for example, the polyalkoxysilylalkyl epoxides, such as gamma-glycidoxypropylmethyldimethoxysilane, gamma-glycidoxypropylmethyldiethoxysilane, gamma-glycidoxypropyltriethoxysilane, and gamma-glycidoxypropyltrimethoxysilane.

Other preferred adhesion promoters include the N-silylalkylamides, such as those disclosed in U.S. Pat. No. 4,826,915, above incorporated by reference herein.

The amount of adhesion promoter (4) used in the RTV silicone compositions of this will typically be in the range of from about 0.1 to about 10, preferably from about 0.2 to about 5, and most preferably from about 0.5 to about 1, parts by weight, per 100 parts of the polyalkoxysilyl-terminated polydiorganosiloxane (1).

Adhesion promotion is frequently optimized if component (4) is used in combination with (5) a cyanoalkyltrialkoxysilane, most often 2-cyanoethyltrimethoxysilane (hereinafter "CETMS") or 3-cyanopropyltrimethoxysilane, which acts as a synergist therefor. When used, component (5) is usually present in the amount of from about 0.1 to about 5.0, preferably from about 0.3 to about 2, and most preferably from about 0.5 to about 1, parts by weight per 100 parts of component (1).

The RTV compositions of this invention may further contain other constituents commonly contained in such compositions, including plasticizers, pigments, and fillers.

Preferably, the RTV compositions of this invention further contains filler (Component (6)). Various fillers can be incorporated into the composition of the present invention such as, for example, titanium dioxide, zirconium silicate, silica aerogel, iron oxide, diatomaceous earth, fumed silica, carbon black, precipitated silica, glass fibers, polyvinyl chloride, ground quartz, calcium carbonate, and the like. The preferred filler for use in the composition of this invention is reinforcing filler and most preferably fumed silica filler.

The amount of filler used can vary within wide limits in accordance with the intended use. For example, in some sealant applications, the curable compositions of the present invention can be used free of filler. In other applications, such as employment of the curable compositions for making binding material, as much as 700 parts or more of filler per 100 parts by weight of the polyalkoxysilyl-terminated polydiorganosiloxane (1).

The compositions of the present invention also can be used as construction sealants and caulking compounds. The exact amount of filler, therefore, will depend upon such factors as the application for which the composition is intended and the type of filler used. Preferably, from about 5 to about 100 parts of filler, which can include up to about 40 parts, and preferably from about 5 to about 40 parts, of reinforcing filler, such as fumed silica filler, per 100 parts of component (1) is used.

It is frequently advantageous to pretreat a silica filler with an activating agent such as octamethylcyclotetrasiloxane.

In preferred embodiments, the RTV compositions of this invention further contain a beta-diketone (component (7)) capable of chelating with the tin condensation catalyst of formula (V). The beta-diketone, hereinafter referred to as "the chelating ligand", has been found to impart improved shelf stability to the RTV composition when used in effective amounts. Suitable beta-diketones for use in this invention are disclosed, for example, in U.S. Pat. No. 4,863,992 (Wengrovius et al.), which has previously been incorporated by reference herein.

From a cost and availability standpoint, the preferred chelating ligand is 2,4-pentanedione. However, the Environmental Protection Agency has recently issued a Significant New Use Rule (SNUR) covering 2,4-pentanedione which labels it a potential neurotoxin, mutagen, and developmentally toxic by inhalation. The SNUR essentially prohibits the use of 2,4-pentanedione in any new consumer product, thus greatly restricting the marketability of RTV sealants containing it. Other, relatively non-toxic beta-diketones can be used in place of 2,4-pentanedione. Examples of these include 2,2,6,6-tetramethyl-3,5-heptanedione, 1,1,1-trifluoro-2,4-pentanedione, 1-phenyl-1,3-butanedione, 2,4-hexanedione, and 5,7-nonanedione. The most preferred of these non-toxic beta-diketones is 2,4-hexanedione.

The chelating ligand can be present in the RTV compositions of this invention in an amount within the range of from about 0.01 to about 5, preferably from about 0.2 to about 0.8, and most preferably from about 0.3 to about 0.5, part by weight per 100 parts of the alkoxy-functional polydiorganosiloxane (1).

The RTV composition of this invention can further contain a polyalkoxysilane crosslinking agent (Component (8)) of the general formula (II) previously set forth herein. The presence of the polyalkoxysilane contributes to the shelf stability of the RTV composition in the absence of moisture and its rapidity of cure in the presence of moisture.

The polyalkoxy crosslinking agent is typically present in the RTV compositions of this invention in an amount within the range of from about 0.01 to about 20, preferably from about 0.1 to about 2, and most preferably from about 0.5 to about 1.0, parts by weight per 100 parts of the polyalkoxysilyl-terminated polydiorganosiloxane (1).

The composition of the present invention may further contain from about 1 to about 50 parts by weight of a triorganosilyl endstopped diorganopolysiloxane (component 9) having a viscosity of from 10 to 5000 centipoise at 25° C., where the organo groups are monovalent hydrocarbon radicals, preferably of from 1 to 8 carbon atoms. Such linear diorganopolysiloxane polymers are useful as plasticizers. Preferably, such plasticizers are free of silanol groups but usually there is present up to about 500 ppm of silanol groups. It is also preferable that the organo substituent groups are methyl and that the viscosity range from 10 to 100 centipoise at 25° C.

Thus, in its most preferred embodiment, the RTV composition of this invention further contains components (4)–(9), described above.

Other compounds, for example, flame retardants such as platinum, may also be included in the composition of the present invention.

The RTV compositions of the present invention may be prepared by methods known in the art. For example, they may be prepared by mixing all the ingredients together at the same time. Preferably, they are prepared by rigorously blending a mixture of the polyalkoxysilyl-terminated polydiorganosiloxane prepared according to the method of this invention, the cyano-functional polyalkoxy silane (if present), and filler (if present). Afterwards, the tin condensation catalyst and the optional ingredients, e.g., crosslinker, adhesion promoter, and plasticizer, are added separately or together, followed by thorough mixing under anhydrous conditions.

The RTV compositions may be coated on a variety of substrates, particularly masonry substrates. Examples of suitable substrates include aluminum, glass, polyacrylate, polycarbonate, polyvinylchloride, polyphenylene oxide, polyamide, steel, acrylonitrile-butadiene-styrene copolymer, nylon, and concrete.

The Examples given below are provided for the purpose of illustrating the present invention. They are not given for any purpose of setting limits or boundaries to the instant invention. All parts and/or percentages in the Examples are by weight.

EXPERIMENTAL

Examples 1 and 2

One thousand grams of silanol-terminated polydimethylsilicone polymer having a viscosity of 130,000 cps at 25° C. were mixed with 1.5 parts (15 g) of $CH_3Si(OCH_3)_3$, and 0.05 parts (0.5 g) of $nBu_2NH_2+O_2$-CH— (prepared by reacting equimolar amounts of $nBu_2NH$ with formic acid). This reaction was heated to 100° C. for 15 minutes and then cooled to ambient temperature. At this time, the endcapping reaction was found to be complete by $^{29}SiNMR$. The composition was split into two equal parts and 0.2 parts (1.0 g) of ethylformate was added to one of these parts (Example 1). Ethylformate was not added to the other part (Example 2). The viscosities of the two polymer samples were monitored as a function of storage time at 25° C. The viscosity of the silicone polymer containing ethylformate (Example 1) stabilized at a higher level, i.e., 41,000 centipoise at 25° C. than the silicone polymer not containing ethylformate (Example 2), which stabilized at 23,000 centipoise at 25° C. In addition, the silicone polymer containing ethylformate (Example 1) stabilized at a faster rate, i.e., 50 days, than the silicone polymer not containing ethylformate, which stabilized at 250 days. A $^{29}SiNMR$. obtained on both polymer samples after 276 days showed that the polymer not stabilized with ethylformate (Example 2) contained 20% more of unwanted $(CH_3)_2(CH_3O)Si$-endcaps than the polymer containing ethylformate (Example 2). Silicone polymers terminated with $(CH_3)_2(MeO)Si$-endcaps do not cure in an RTV formulation.

The stabilization at higher levels and at faster rates of the polyalkoxysilyl-terminated polydiorganosiloxane stabilized with organic formates indicates that such polymers have greater shelf stability than polyalkoxysilyl-terminated polydiorganosiloxanes prepared in the same manner except for the presence of the organic formate.

What is claimed is:

1. A method for preparing a polyalkoxysilyl-terminated polydiorganosiloxane, comprising the step of reacting at a temperature in the range of from about 10° to about 150° C.:
   (A) 100 parts of at least one silanol-terminated polydiorganosiloxane; and
   (B) at least one polyalkoxysilane in an amount effective for endcapping (A), the polyalkoxysilane having the general formula $(R^2)_aSi(OR^3)_{4-a}$ wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1; the reaction being conducted in the presence of:
   (C) a catalytic amount of an acidic amine salt; and
   (D) an effective amount of an organic formate having the formula $$H-\overset{O}{\underset{\|}{C}}-O-R$$

wherein R is a monovalent organic radical having from 1 to about 20 carbon atoms.

2. A method according to claim 1 wherein R is an alkyl radical having from 1 to about 10 carbon atoms.

3. A method according to claim 2 wherein R is an alkyl radical having from 1 to about 4 carbon atoms.

4. A method according to claim 1 wherein the amount of organic formate is in the range of from about 0.01 to about 10 parts by weight per 100 parts of (A).

5. A method according to claim 4 wherein the amount of organic formate is in the range of from about 0.05 to about 5 parts by weight per 100 parts of (A).

6. A method according to claim 1 wherein the reaction is carried out at a temperature in the range of from about 75° to about 125° C.

7. A method according to claim 6 wherein the reaction is carried out at a temperature in the range of from about 90° to about 110° C.

8. A polyalkoxysilyl-terminated polydiorganosiloxane prepared according to the method of claim 1.

9. An improved alkoxy-functional RTV polydiorganosiloxane composition having increased shelf-stability comprising by weight:
   (1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polyalkoxysilyl-terminated polydiorganosiloxane being the product obtained by reacting at a temperature in the range of from about 10° to about 150° C.:
   (A) 100 parts of at least one silanol-terminated polydiorganosiloxane; and
   (B) at least one polyalkoxysilane in an amount effective for endcapping (A), the polyalkoxysilane having the general formula $(R^2)_aSi(OR^3)_{4-a}$ wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1; the reaction being conducted in the presence of:

(C) a catalytic amount of an acidic amine salt; and (2) an effective amount of a diorganotin bis beta-diketonate condensation catalyst of the general formula:

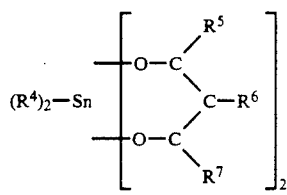

wherein $R^4$ is selected from $C_{(1-18)}$ monovalent hydrocarbon radicals and substituted monovalent hydrocarbon radicals, and $R^5$, $R^6$, and $R^7$ are the same or different monovalent radicals selected from the class consisting of hydrogen, $R^4$, $OR^4$, —$Si(R^4)_3$, —$OSi(R^4)_3$, aryl, acyl, and nitrile wherein the improvement comprises adding to the reaction mixture containing (A), (B) and (C) before the reaction (D) an effective amount of an organic formate having the formula

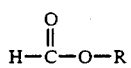

wherein R is a monovalent organic radical having from 1 to about 20 carbon atoms whereby (D) reacts rapidly with the amino portion of the acidic amine salt catalyst and thereby decomposes the catalyst quickly and thus removes the acidic amine salt catalyst and alcohol by-product from the reaction product in order to prevent the silicone redistribution reactions and viscosity loss which adversely affect the shelf stability of the RTV composition.

10. An improved alkoxy-functional RTV polydiorganosiloxane composition having i increased shelf-stability comprising by weight:

(1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical, the polyalkoxysilyl-terminated polydiorganosiloxane being the product obtained by reacting at a temperature in the range of from about 10° to about 150° C.:

(A) 100 parts of at least one silanol-terminated polydiorganosiloxane; and (B) at least one polyalkoxysilane in an amount effective for endcapping (A), the polyalkoxysilane having the general formula

wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1; the reaction being conducted in the presence of:

(C) a catalytic amount of an acidic amine salt;

(2) an effective amount of a diorganotin bis beta-diketonate condensation catalyst of the general formula:

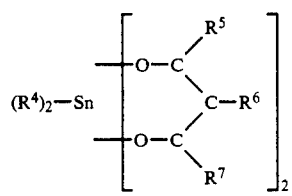

wherein $R^4$ is selected from $C_{(1-18)}$ monovalent hydrocarbon radicals and substituted monovalent hydrocarbon radicals, and $R^5$, $R^6$, and $R^7$ are the same or different monovalent radicals selected from the class consisting of hydrogen, $R^4$, $OR^4$, —$Si(R^4)_3$, —$OSi(R^4)_3$, aryl, acyl, and nitrile wherein the improvement comprises adding to the composition (3) an effective amount of an organic formate having the formula

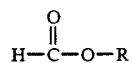

wherein R is a monovalent organic radical having from 1 to about 20 carbon atoms whereby (3) reacts rapidly with the amino portion of the acidic amine salt catalyst and thereby decomposes the catalyst quickly and removes the acidic amine salt catalyst and alcohol by-product in order to prevent the silicone redistribution reactions and the viscosity loss which adversely affect the shelf stability of the RTV composition.

11. A composition according to claim 10 wherein the wherein R is an alkyl radical having from 1 to about 10 carbon atoms.

12. A composition according to claim 11 wherein R is is an alkyl radical having from 1 to about 4 carbon atoms.

13. A composition according to claim 10 wherein the amount of organic formate is in the range of from about 0.01 to about 10 parts by weight per 100 parts of (1).

14. A composition according to claim 13 wherein the amount of organic formate is in the range of from about 0.05 to about 5 parts by weight per 100 parts of (1).

15. A composition according to claim 9 further comprising at least one of the following, all proportions being per 100 parts of component (1):

(4) from about 0.1 to about 10 parts of an adhesion promoter;

(5) from about 0.1 to about 5 parts of a cyanoalkyltrialkoxysilane;

(6) from about 5 to about 100 parts of at least one filler;

(7) from about 0.01 to about 5 parts of a beta-diketone;

(8) from about 0.01 to about 20 parts of a polyalkoxysilane crosslinking agent of the general formula:

$$(R^2)_a Si(OR^3)_{4-a}$$

wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1; and (9) from about 1 to about 50 parts of a triorganosilyl-endstopped polydiorganosiloxane as plasticizer.

16. A composition according to claim 10 further comprising at least on of the following, all proportions being per 100 parts of component (1):

(4) from about 0.1 to about 10 parts of an adhesion promoter;

(5) from about 0.1 to about 5 parts of a cyanoalkyltrialkoxysilane;

(6) from about 5 to about 100 parts of at least one filler;

(7) from about 0.01 to about 5 parts of a beta-diketone;

(8) from about 0.01 to about 20 parts of a polyalkoxysilane crosslinking agent of the general formula:

$$(R^2)_a Si(OR^3)_{4-a}$$

wherein each $R^2$ is independently an unsubstituted or substituted hydrocarbon radical containing from 1 to about 15 carbon atoms, each $R^3$ is independently an alkyl, alkoxyalkyl, acylalkyl, acyloxyalkyl or cyanoalkyl radical containing from 1 to about 8 carbon atoms or an aralkyl radical containing from 1 to about 14 carbon atoms, and "a" is 0 or 1; and (9) from about 1 to about 50 parts of a triorganosilyl-endstopped polydiorganosiloxane as plasticizer.

17. An article comprising a substrate coated with an alkoxy-functional RTV polydiorganosiloxane composition selected from the RTV polydiorganosiloxane composition of claim 9 and the RTV polydiorganosiloxane composition of claim 10.

* * * * *